United States Patent [19]
Jones

[11] 3,801,453
[45] Apr. 2, 1974

[54] FUEL ASSEMBLY FOR POWER GENERATING NUCLEAR REACTOR

[75] Inventor: Cecil R. Jones, Hamden, Conn.

[73] Assignee: Transfer Systems Incorporated, New Haven, Conn.

[22] Filed: Feb. 11, 1972

[21] Appl. No.: 225,406

[52] U.S. Cl. .................................... 176/78, 178/79
[51] Int. Cl. .............................................. G21c 3/32
[58] Field of Search .......................... 176/78, 34, 50

[56] References Cited
UNITED STATES PATENTS

| | | | |
|---|---|---|---|
| 3,366,546 | 1/1968 | Anthony et al. | 176/78 |
| 3,481,832 | 12/1969 | Rickert | 176/50 |
| 3,407,115 | 10/1968 | North, Jr. et al. | 176/78 X |
| 3,395,077 | 7/1968 | Tong et al. | 176/78 |
| 2,898,280 | 8/1959 | Schultz | 176/78 |

*Primary Examiner*—Reuben Epstein

[57] ABSTRACT

A fuel assembly especially adapted for a pressurized water reactor is described. It comprises a support assembly of control element guide tubes, upper and lower end fittings, and grid spacers holding a plurality of fuel rods in vertical parallel relation. The fuel assembly features a removable upper end fitting allowing on-site access to and removal of individual fuel rods, and a novel guide tube construction providing high volume coolant flow through the assembly and allowing ready access of a grapple having laterally, outwardly extending gripping fingers to the assembly for lifting purposes.

11 Claims, 5 Drawing Figures

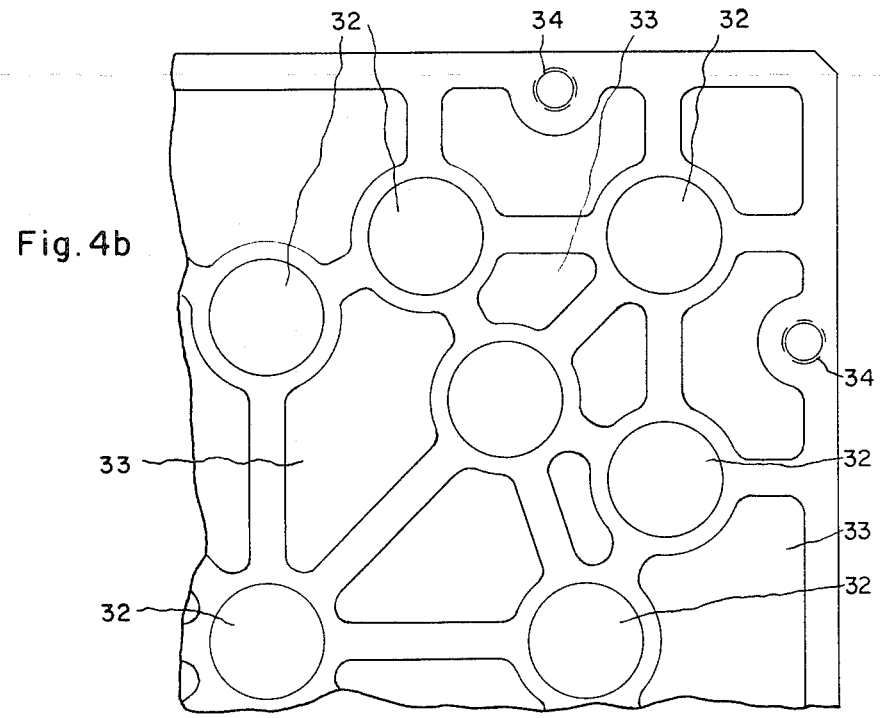
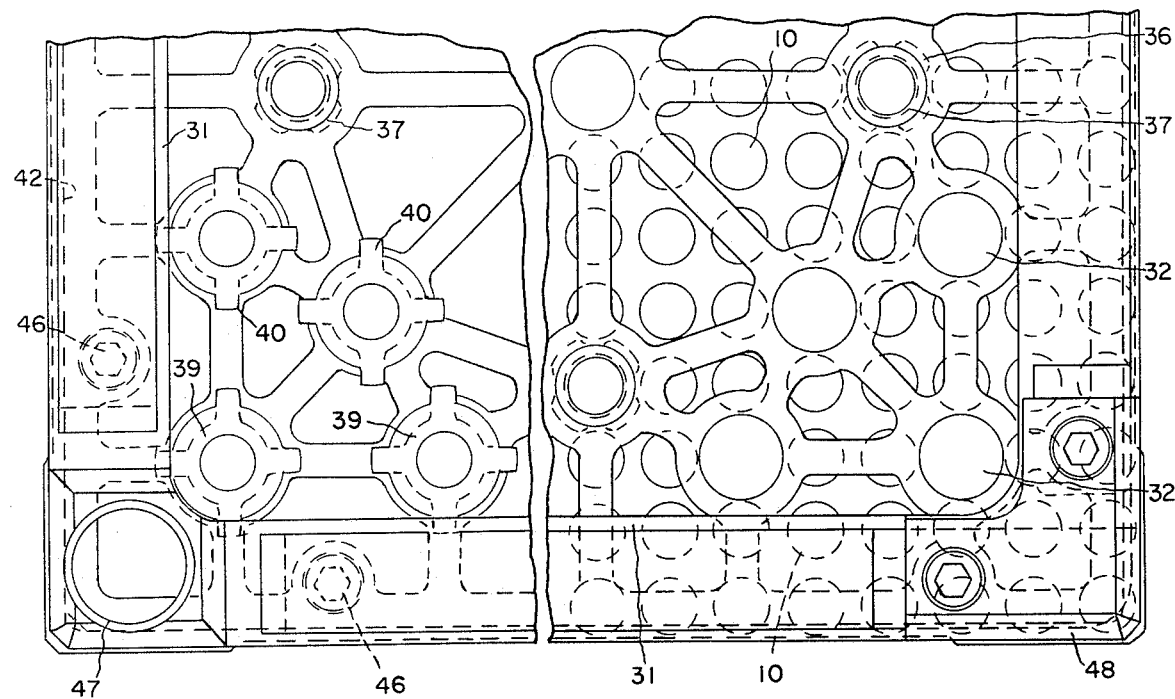
Fig. 4b
Fig. 4c
Fig. 4a

FUEL ASSEMBLY FOR POWER GENERATING NUCLEAR REACTOR

This invention relates to nuclear fuel assemblies for a power-generating nuclear reactor, and in particular to such fuel assemblies especially adapted for a pressurized water reactor (PWR).

A typical fuel assembly for a PWR comprises an open supporting frame made up of a plurality of parallel hollow guide tubes secured at opposite ends to upper and lower end fittings. Secured to the guide tubes in intermediate positions in vertically spaced planes are a plurality of apertured grid spacers. The nuclear fuel elements are in the form of elongated rods or pins generally comprising a hollow tube of zirconium or a zirconium alloy packed with radioactive pellets such as $UO_2$ pellets. The fuel pins form a bundle of spaced, parallel, vertically disposed pins with each individually positioned and held within the frame within aligned apertures of the spacer grids between the end fittings. A plurality of such assemblies are mounted within the reactor core. The guide tubes are designed to accommodate a suitable control rod assembly to control the neutron flux density during operation. The heat generated by the radioactive material is transferred to a coolant, typically light water, pumped vertically through the assembly from below and in heat transfer contact with each of the fuel pins.

Several problems are encountered in the operation of such a system. First, to keep the heat generation as uniform as possible, it is desirable frequently to refuel with fresh fuel assemblies and also to reshuffle existing assemblies. To reduce reactor downtime for refuelling, the provision of fuel assemblies that can be rapidly gripped, lifted out of the reactor core, and replaced or reshuffled, is essential. In my prior copending application, Ser. No. 220,751, filed Jan. 26, 1972, I illustrate (FIG. 12) and describe a stiff grapple designed for rapid engagement and gripping of a fuel assembly having recessed areas in the upper fitting to receive outwardly movable, laterally extending fingers. Such a grapple can be speedily positioned over a desired fuel assembly, and rapidly brought into engagement with and locked to the assembly for lifting same.

A second problem, also described in said copending application, is the possibility of coolant contamination arising from a leaking or fractured fuel rod. It is desirable rapidly to locate and replace leaking or defective fuel assemblies and preferably the specific leaking or defective fuel rod therein at the reactor site. In FIG. 1 of said copending application I illustrate a fuel assembly for a boiling water reactor (BWR) which features an upper end fitting capable of disassembly allowing on-site removal and access to the individual fuel rods. However, such a feature is not available in the conventional fuel assemblies used in a PWR.

A principal object of the invention is a fuel assembly especially adapted for a PWR and offering one or more of the following: (1) an upper fitting capable of disassembly to provide access to individual fuel pins for on-site removal, (2) a guide support construction providing high volume coolant flow through the assembly to increase heat transfer, and (3) a construction providing for ready gripping by a lifting grapple permitting rapid removal from the reactor core.

These and further objects and advantages of the invention are achieved with a fuel assembly having an open fuel rod supporting frame formed by upper and lower end fittings and intermediate spacer grids joined together by guide tubes and characterized by the upper end fitting being removably mounted on the upper ends of the guide tubes by means accessible and removable from the top of the assembly. A further feature of the invention is construction of the upper end fitting as separable bottom and top parts, with the bottom part in the form of an apertured plate secured to the guide tubes by removable fastening means, and the top part in the form of an annular member removably secured to the bottom part and providing recessed areas for receiving the lifting fingers of a stiff grapple.

These and other features and advantages of the invention will become clearer from the following detailed description taken in conjunction with the accompanying drawings, wherein:

FIG. 4 is a partly schematic composite plan view of different sections of the upper end fitting taken from the top of the assembly of FIG. 1, with FIG. 4a showing the fuel rod array, FIG. 4b showing the bottom plate of the upper end fitting, and FIG. 4c showing the fastening means arrangement for the bottom plate;

Figure 1:
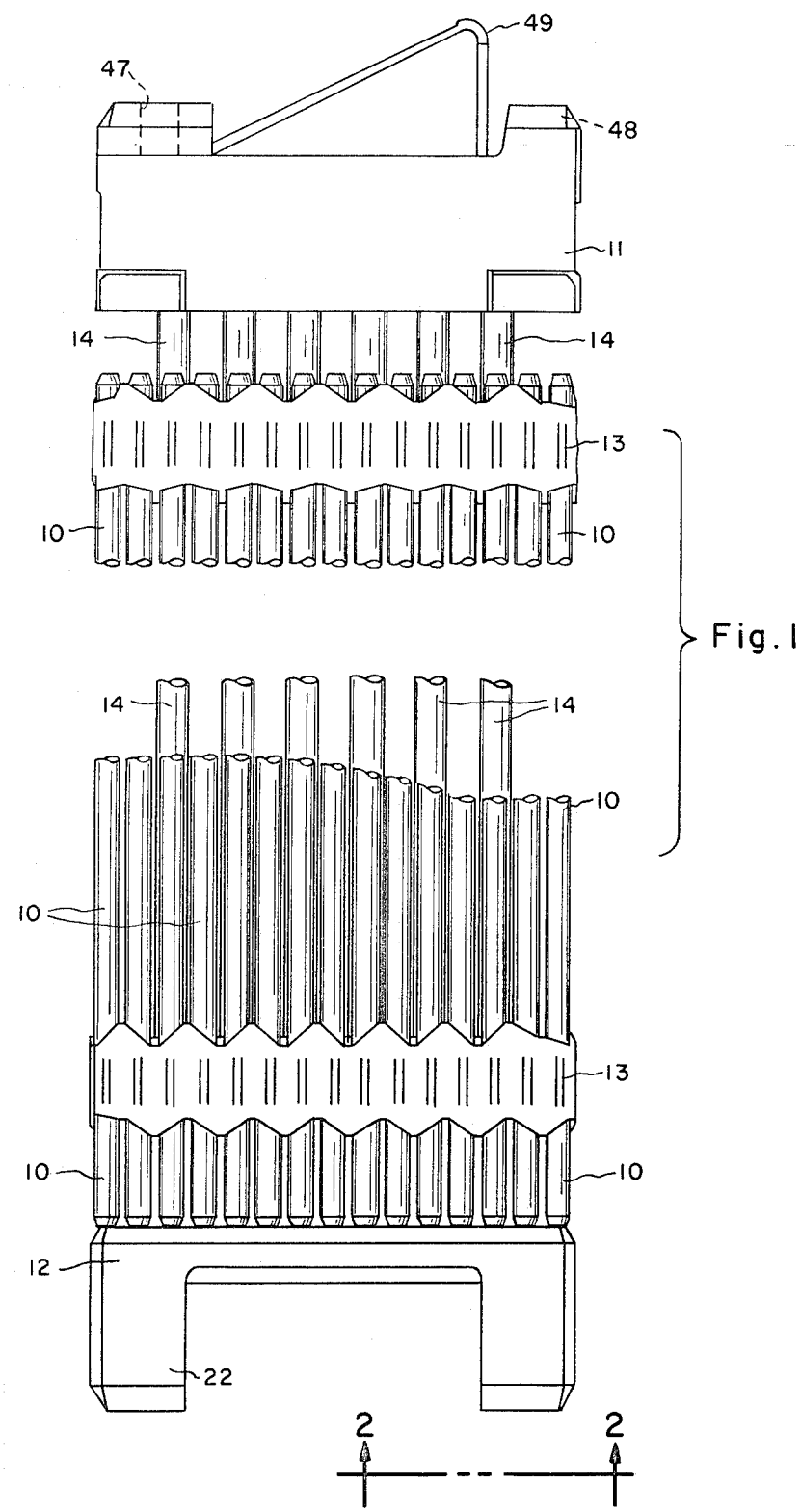
FIG. 1 is an elevational view of one form of fuel assembly in accordance with the invention with the center broken away.

As previously explained, a PWR comprises a reactor core housed in a pressure vessel and supporting a plurality of fuel assemblies through which water coolant as a heat absorber and moderator is flowed. FIG. 1 illustrates one form of fuel assembly in accordance with the invention useful in such a system. It comprises an open supporting frame for a plurality of fuel elements generally in the form of fuel rods or fuel pins 10. Each of the fuel rods 10 may be of conventional construction comprising for example a hollow tube of a zirconium alloy enclosing $UO_2$ pellets. A typical pin has a diameter of about one-quarter inch and a length of about 10 feet. The fuel rod supporting frame comprises upper 11 and lower 12 end fittings and a plurality of spacer grids 13 joined together by a plurality of control rod guide tubes 14. Typically, these assembly parts are of non-corrosive material, such as stainless steel or zirconium. The spacer grids 13 are of conventional construction, for example, eggcrate construction, containing an array of apertures for receiving the fuel rods 10, which pass freely therethrough. The guide tubes 14 are permanently secured as by welding or brazing to the spacer grids 13 to form a rigid construction. Typically six to eight spacer grids will be present.

Figure 3:
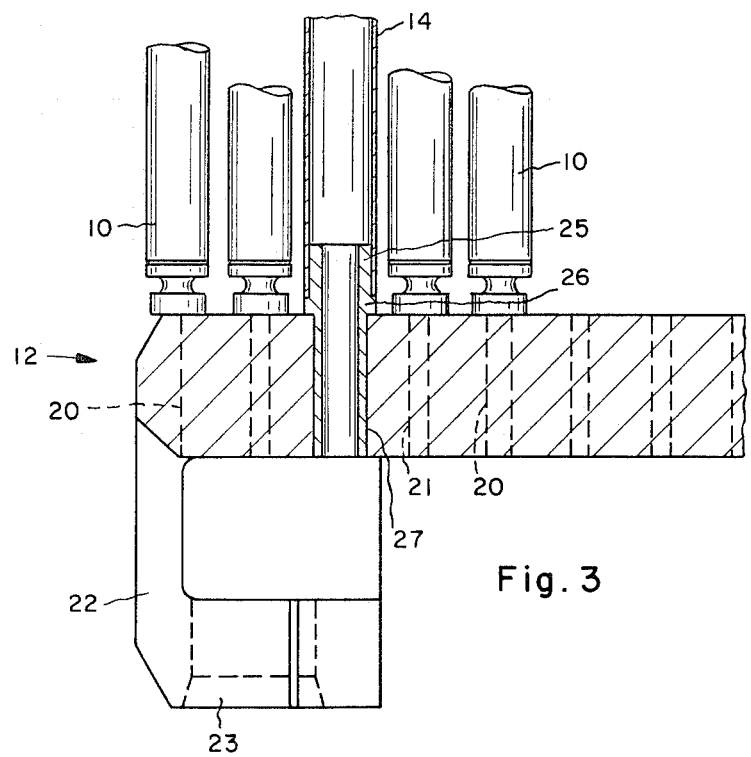
FIG. 3 is a partial cross sectional view along the line 3—3 of FIG. 2 with detail omitted for simplicity.
Figure 2:
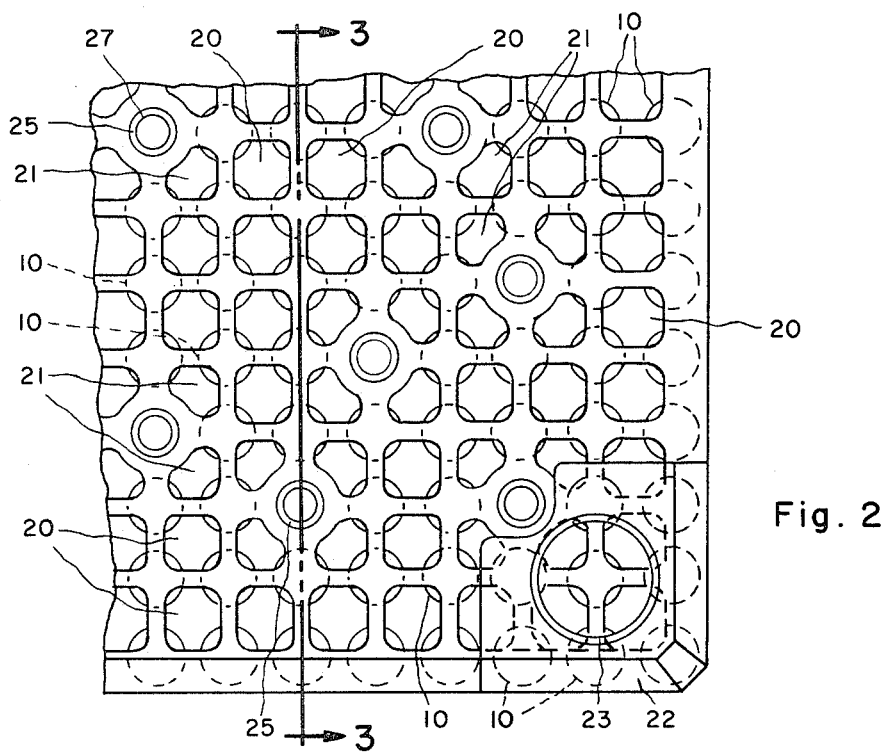
FIG. 2 is a partial bottom view of the assembly of FIG. 1.

The guide tubes 14 are also permanently secured to the lower end fitting 12, which is illustrated in FIGS. 2 and 3. FIG. 2 is a bottom view of one quadrant of the lower end fitting 12 which is generally in the form of a square plate, with the remaining three quadrants having a similar configuration. The plate bottom contains an array of flow apertures or passageways allowing a high flow of water up through the bundle of fuel pins 10, each of which rest on the upper plate surface so as to be surrounded by apertures on four sides for maximum coolant flow and heat transfer. In FIG. 2 are shown a total of 57 fuel rods 10. The plate apertures are mainly of two types. Those apertures only adjoining fuel rods 10 are generally square and are designated 20. Those apertures which also adjoin a guide tube 14 are generally triangular and are designated 21. Depicted in FIG. 2 are the bottoms of 6 guide tubes 14. Each corner of the lower fitting 12 is provided with a foot portion 22, with two of them along a diagonal containing an aperture 23 for receiving a locating pin (not shown) in the reactor core base.

As illustrated in FIG. 3, which shows only one guide tube and four fuel rods, each lower end of the hollow guide tubes 14 is provided with a brazed sleeve 25 having an intermediate shoulder 26. The free sleeve end is force fitted into an aperture 27 in the plate 12 and thus anchored to the plate. The bottom ends of the fuel rods are sealed off and given a suitable configuration to enable them to rest on the plate surface as shown.

Figure 5:
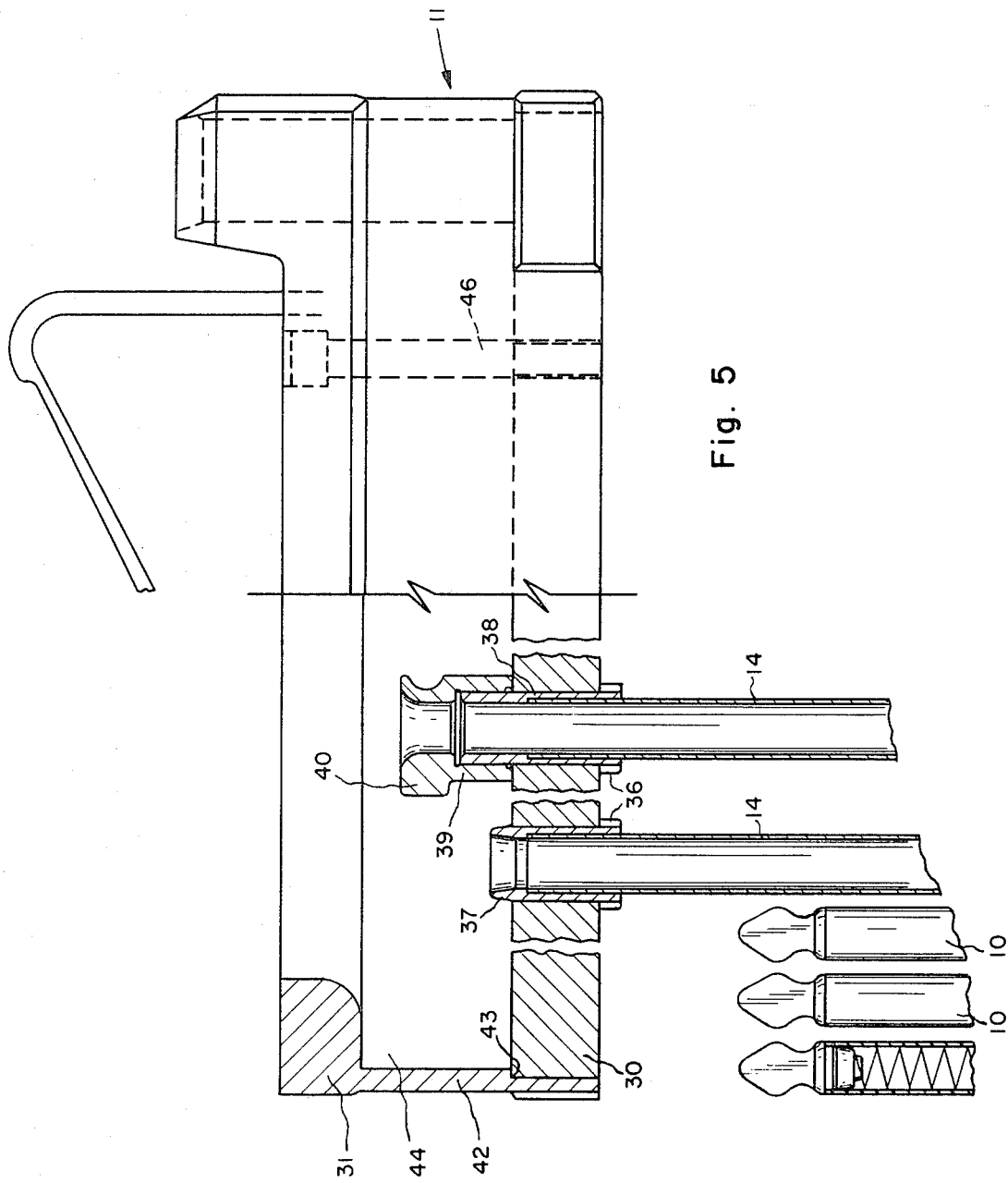
FIG. 5 is a schematic partly cross-sectional view of the upper part of the fuel assembly of FIG. 1 with detail omitted for clarification.

Whereas the grid spacers 13 and lower end fitting 12 are permanently secured to the guide tubes 14, the upper end fitting 11 is removably secured thereto, which is illustrated in FIGS. 4 and 5. Referring first to FIG. 5, the upper fitting is formed into two separable parts, a bottom part 30 and fitting top part 31. The bottom part 30 is a generally square apertured plate having openings 32 to receive the upper ends of the guide tubes, and the remainder of the plate 30 is cut away, within the limitation of ensuring sufficient plate strength, to allow maximum water flow. FIG. 4b is a plan view of slightly over one quadrant of the plate 30, separate from the assembly, showing the guide tube receiving apertures 32, and the cut-away water passageways 33. Also shown along the border are two threaded holes 34 used for securing of the top part 31. The remaining three quadrants are similar.

The bottom part 30 is removably secured to the upper ends of the guide tubes 14 by suitable fastening means, one form of which is illustrated in FIG. 5. To the ends of the guide tubes 14 is brazed a sleeve with a lower flange 36 (see FIG. 4a) on which the plate 30 rests but the sleeves on the guide tubes 14 adjacent the fitting sides, designated 37, are shorter with a smooth surface, which slip freely through the aligned apertures of the bottom part 30, whereas the remaining sleeves, designated 38, are taller and have a threaded end to receive a locking nut 39 for securing the plate 30 to the guide tube 14. The nuts 39 have a fluted top 40 to be received by a grapple or special tool (not shown) capable of removing the nut from the top.

The top part 31 is generally annular with the center open and formed with an outer depending skirt 42 which fits over the periphery of the bottom part 30 until stopped by a shoulder 43. The recessed area 44 under the annular edge serves to receive the gripping fingers of the lifting grapple described in my copending application. The shorter sleeves 37 affixed to the adjacent guide tubes provide more room for access to the adjacent recessed areas for the grapple.

The top and bottom parts 30, 31 are secured together by eight bolts 46, removable from the top, which engage the threaded holes 34. Only one of these bolts is shown in FIG. 5. FIG. 4c is a plan view of a little less than one quadrant of the assembly taken from the top to illustrate the bolts 46 and the nuts 39 with the fluted tops 40 in place. FIG. 4a is a similar view but of a different quadrant and with the nuts 39 and associated guide tubes removed. This Figure also shows the fuel rods 10 below in position. The remaining quadrants again would be similar. Two of the diagonal corners of the plate 31, one of which is shown in FIG. 4c, have openings 47 for receiving locating pins on the lifting grapple. The remaining diagonal corners, one of which is illustrated in FIG. 4a, have bolted fittings 48 for clamping the usual hold-down leaf spring 49 which is mounted on top of the assembly (shown in FIG. 1 but not in FIG. 4a) and urged downwardly by a hold down plate (not shown) in the reactor core.

The procedure for removing individual fuel rods 10 is as follows. A grapple is brought down and secured to the fuel assembly and then the latter lifted out and placed in the storage pool. Next, the bolts 46 are removed from the top. Then the top part 31 with attached leaf spring is lifted off and removed. Next, all of the guide tube nuts 39 are removed, and the bottom part 30 can be lifted off and removed. Now all of the fuel rods 10 are accessible from the top and selected ones can be removed as desired by means of a special tool (not shown) for gripping the upper ends of the fuel rods and lifting same out of the spacers. As will be observed in FIG. 4a the flanges 36 on the sleeves 37, 38 are scalloped to provide clearance for removal of the adjacent fuel rods. After the defective fuel rods have been replaced, the removed parts can be reassembled by following the reverse procedure. For ease of assembly, the bottom of the apertures 32 in the plate 30 and/or the upper ends of the guide tubes may be tapered.

There has been described a sturdy fuel assembly especially adapted for a PWR and featuring a removable upper end fitting providing ready access to and rapid removal of individual fuel rods. Further, the upper end fitting, which also serves as a lifting fixture, is adapted to receive the stiff grapple of my copending application. Still further, the above features have not been obtained at the expense of restricting water flow. To the contrary, as illustrated in FIG. 2, ample water flow passageways are provided for each of the fuel rods at the assembly bottom. As illustrated in FIG. 4, large passageways for water flow are provided at the assembly top.

It will be understood that while the construction described is preferred, other ways of joining the parts together may be substituted. This applies especially to the connections between the guide tubes and end fittings, and those joining the two upper fitting parts together.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A fuel assembly for a nuclear reactor, comprising an open support frame having vertically spaced upper and lower end fittings and intermediate grid spacers joined to a plurality of spaced parallel upright controlrod-receiving hollow, empty guide tubes and supporting in spaced parallel relation a plurality of separable upright fuel rods, fastening means removable from the top and removably connecting said upper end fitting directly to the guide tubes and separable from the guide tubes enabling individual fuel rod removal from the assembly, and means connected to the fastening means for lifting the assembly whereby the load path extends through said guide tubes, said fastening means being hollow to enable control rod passage therethrough.

2. A fuel assembly as claimed in claim 1 characterized in that the lower end fitting comprises an apertured plate permanently secured to the guide tube lower ends, and the fuel rods rest on the surface of the lower end fitting.

3. A fuel assembly as claimed in claim 2 characterized in that a plurality of said fuel rods are each adjacent a plurality of apertures in the lower end fitting.

4. A fuel assembly for a nuclear reactor, comprising an open support frame having vertically spaced upper and lower end fittings and intermediate grid spacers joined to a plurality of spaced parallel upright control-rod-receiving guide tubes and supporting in spaced parallel relation a plurality of upright fuel rods, said upper end fitting being removably connected to the guide tubes and separable from the guide tubes and fuel rods enabling individual fuel rod removal from the assembly, said upper end fitting comprising separable top and bottom parts, said bottom part having an array of first apertures for receiving the upper ends of the guide tubes and an array of large second apertures for coolant flow, and removable fastening means for securing the said bottom part to the guide tubes.

5. A fuel assembly as claimed in claim 4 characterized in that the fastening means comprise nuts secured to threaded ends of only some but not all of the guide tubes.

6. A fuel assembly as claimed in claim 5 characterized in that the guide tubes adjacent the side borders of the bottom part are shorter than the remaining guide tubes.

7. A fuel assembly as claimed in claim 1 wherein the fuel rod tops terminate below the upper end fitting.

8. A fuel assembly for a nuclear reactor, comprising an open support frame having vertically spaced upper and lower end fittings and intermediate grid spacers joined to a plurality of spaced parallel upright control-rod-receiving guide tubes and supporting in spaced parallel relation a plurality of separable upright fuel rods, said upper end fitting comprising separable top and bottom parts and being removably connected to the guide tubes and separable from the guide tubes and fuel rods enabling individual fuel rod removal from the assembly, the top part of the upper end fitting being generally annular with a depending skirt portion engaging the end of said bottom part.

9. A fuel assembly as claimed in claim 8 characterized in that bolts removable from the top secure the said top part to the said bottom part.

10. A fuel assembly for a nuclear reactor, comprising an open support frame having vertically spaced upper and lower end fittings and intermediate grid spacers joined to a plurality of spaced parallel upright control-rod-receiving guide tubes and supporting in spaced parallel relation a plurality of separable upright fuel rods, said upper end fitting comprising separable top and bottom parts and being removably connected to the guide tubes and separable from the guide tubes and fuel rods enabling individual fuel rod removal from the assembly, fastening means removable from the top and joining the top and bottom parts of the upper end fitting, and fastening means removable from the top and securing the said bottom part to the guide tubes.

11. A fuel assembly as set forth in claim 10 wherein the removable fastening means for the guide tubes are located within a space formed between the top and bottom parts, and the top part forms a recess along its edge for receiving a grapple.

* * * * *